United States Patent [19]

Koulicovitch

[11] 3,724,959

[45] Apr. 3, 1973

[54] HIGH PRECISION PHOTOELECTRIC MICROSCOPE FOR READING THE MARK OF A PRECISION RULER

[75] Inventor: Maurice Koulicovitch, Geneva, Switzerland

[73] Assignee: Societe Genevoise D'Instruments De Physique, Geneva, Switzerland

[22] Filed: June 7, 1971

[21] Appl. No.: 150,641

[30] Foreign Application Priority Data

June 29, 1970 Switzerland ..........................9765/70

[52] U.S. Cl. ..................................................356/170

[51] Int. Cl. ..................................................G01b 11/04

[58] Field of Search .......356/150, 170, 172; 250/237

[56] References Cited

UNITED STATES PATENTS

| | | | |
|---|---|---|---|
| 3,369,444 | 2/1968 | Patrignani | 356/170 |
| 3,560,097 | 2/1971 | Gavrilkin et al. | 356/170 |
| 3,604,810 | 9/1971 | Schuch | 356/170 |

*Primary Examiner*—William L. Sikes
*Attorney*—Young & Thompson

[57] ABSTRACT

This invention concerns a high precision photoelectric microscope for reading the stroke of a precision ruler, comprising an optical sighting device, a deflector causing a pencil of luminous rays to oscillate periodically from one side to the other of a median position, and a photoelectric cell capturing the luminous pencil reflected by the surface of the precision ruler and controlling an electronic device for indicating the eccentricity of the mark aimed at. This apparatus is characterized in that it comprises a deflection member, attached to the oscillating deflector, which receives a portion of the incident rays and returns them through a fixed mask, onto a second photoelectric cell. It comprises further an interferometer, the mobile portion of which is attached to the deflector, and the photoelectric cell of which emits counting impulses. And finally it comprises an auxiliary electronic device supplied by the second photoelectric cell as well as by the photoelectric cell of the interferometer, this auxiliary device sending to the electronic indication device counting impulses distributed over a field of measurement determined by said fixed mask.

9 Claims, 3 Drawing Figures

INVENTOR
MAURICE KOULICOVITCH
BY Young & Thompson
ATTYS.

HIGH PRECISION PHOTOELECTRIC MICROSCOPE FOR READING THE MARK OF A PRECISION RULER

The photoelectric microscopes according to U.S. Pat. Nos. 3,489,905 and 3,624,403, which are provided for sighting the stroke of a precision ruler, are based upon an analog transformation of the distance to be determined into a measurable electrical voltage.

The idea enables photoelectric microscopes to be easily used for effecting positional control. If, however, a positional control is not desired, and particularly if the value of a measurement is to be recorded, it becomes necessary to introduce an element which expresses the magnitude of the characteristic voltage in numerical values, this being achieved, by definition, with a numerical volt meter.

This arrangement is neither the best nor the most logical, since the system starts from a phase criterion which is extremely stable, the to-and-fro movement of the deflector which rigidly determines a lapse of time which is not influenced by the succeeding electronic elements, and since the final measurement is expressed by passing through intermediate devices which may be influenced by a large number of more or less variable parameters, such as the supply voltage of the listable circuit and the quality of the volt meter.

The object of the present invention is a photoelectric microscope which continuously compares the positional divergence of the ruler stroke to be measured from the optical axis of the photoelectric microscope with the number of interference fringes, counted from a reference fixed to the photoelectric microscope. In this way, the display of the divergence is effected by a purely numerical route, without passing through any analog measurement, thus eliminating risks of instability. For this purpose the present invention has as its object a high accuracy photoelectric microscope for reading the stroke of a precision ruler, comprising an optical sighting device, a deflector causing a pencil of luminous rays to oscillate periodically from one side to another of a median position, and a photoelectric cell receiving the luminous pencil reflected by the surface of the precision ruler and controlling an electronic device indicating the eccentricity of the stroke aimed at, characterized by the fact that it comprises a deflection member, attached to the oscillating deflector, which receives a portion of the incident rays and returns them through a fixed mask onto a second photoelectric cell, by the fact that it further comprises an interferometer, the mobile portion of which is attached to the deflector and the photoelectric cell of which emits counting impulses, and by the fact that it comprises an auxilliary electronic device supplied from the second photoelectric cell as well as from the photoelectric cell of the interferometer, this auxilliary device sending to the electronic indicator device counting impulses distributed in a measuring field determined by said fixed mask.

The attached drawing illustrates schematically and by way of example one embodiment of the photoelectric microscope according to the present invention.

Figures 1, 2, 3:
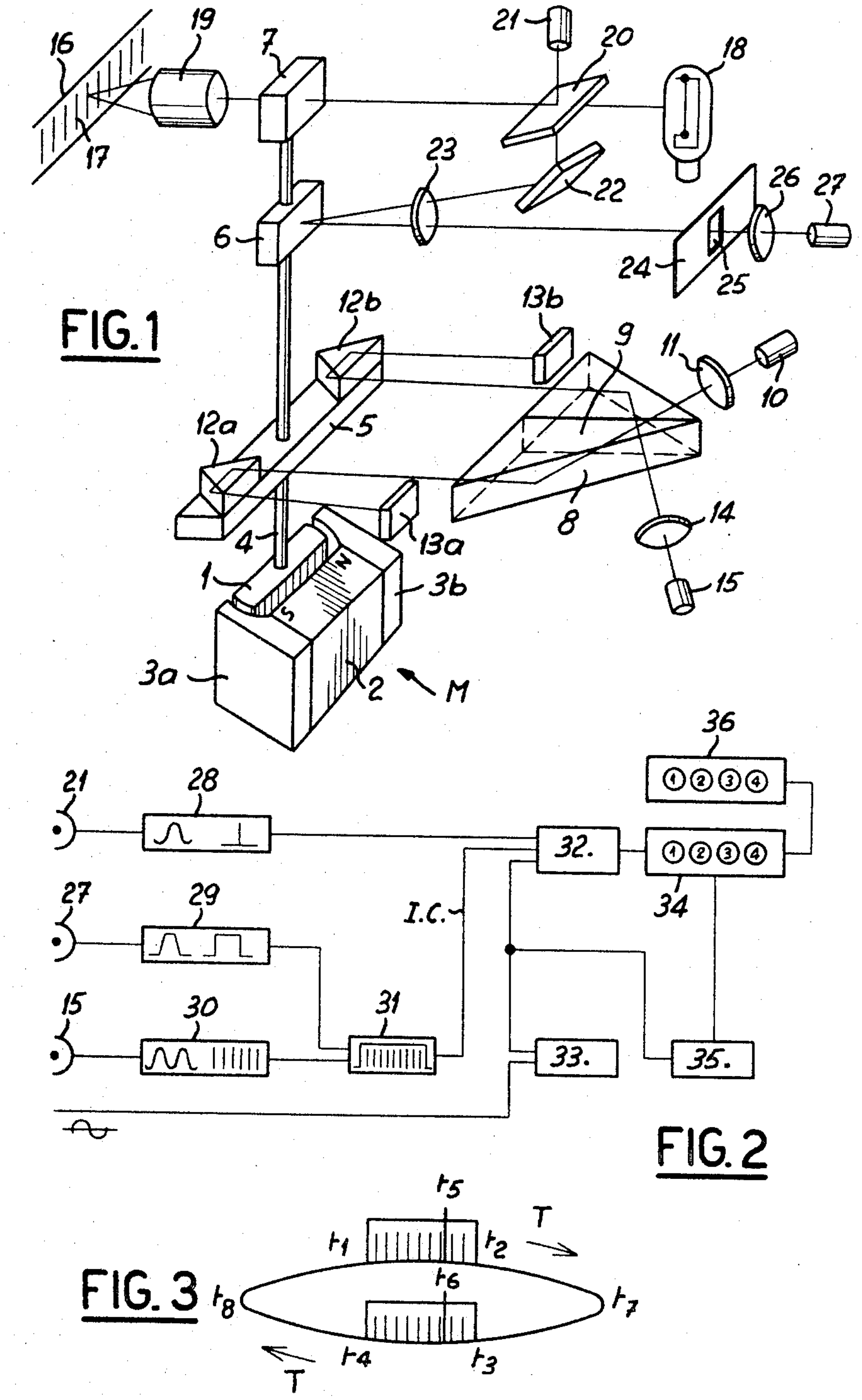
FIG. 1 shows schematically an arrangement of a fringe counting photoelectric microscope for obtaining a purely numerical display.
FIG. 2 is a block diagram of the functioning of the photoelectric microscope.
FIG. 3 is a diagram explaining the operating principle of the system.

The time axis is represented by an ellipse to indicate the cyclical character of the phenomenon to be explained. It will be assumed that time T moves in a clockwise direction. The vertical axis represents arbitrary electrical voltages.

The electrodynamic motor M (FIG. 1), formed by a coil 1 supplied with alternating current (connections not shown), suspended on flexible plates (not shown), oscillates about its vertical axis in the field produced by the magnet 2 and the pole pieces **3*a* and 3*b***.

The oscillating coil drives a rigid shaft 4 upon which are mounted the support 5, a deflection member formed by a mirror 6 and the deflector formed by the plano-parallel glass 7. These members are connected in a completely rigid manner and it is clear that they will carry out together all the normally regular oscillation movements or, should occasion arise, movements perturbed for any reason.

Three separate functions are executed synchronously:

Firstly at the level of the support 5:

An impulse generator produces impulses rigorously related to the displacements of support 5. This generator consists of an interferometer comprising a Kosters prism 8. It will be recalled that a Kosters prism is a conventional element formed of two 30° prisms glued together with a semitransparent interface 9. The light emitted by a substantially monochromatic source, such as a gallium arsenide lamp 10, collimated by the lens 11, penetrates the Kosters prism perpendicularly to its face, and is half-reflected while half of it passes through the surface 9. The two half-pencils are reflected completely at the hypotenuse faces of the two 30° prisms and leave perpendicularly through the base of the Kosters prism in two pencils which are coherent with one another. These two pencils are reflected by the prisms comprising optical squares **12*a* and 12*b* fixed to the support 5 and reflected back by the fixed mirrors 13*a* and 13*b*. The two pencils then make the return journey in the opposite direction, re-unite at the semitransparent surface 9 and interfere. One half of the returning light is lost by transparency (it returns towards the source) but the other reflected half leaves the prism perpendicularly to the hypotenuse of one of the 30° prisms. It is concentrated by the lens 14 and falls on the photoelectric cell 15. When the support 5 oscillates, moving with it the two optical squares 12*a* and 12*b***, the two paths, along which the two half-pencils travel, continuously change. One becomes shorter while the other becomes longer.

Since the two pencils interfere at their junction on the interface 9, the cell 15 produces an alternating current of high frequency, as a result of the large number of fringes which pass, which is moreover modulated in frequency by the instantaneous speed of the oscillating system.

The optical squares **12*a* and 12*b*** enable the reflected pencils to return parallel to the incident pencils. The general arrangement means that the paths along which the pencils travel are, for each side of the interferometer, four times the length of the distance separating the mobile elements from the fixed elements. Consequently, when one of the optical squares approaches (and the other moves away), there will be eight variations of luminous intensity for one corresponding displacement of one wavelength. By selecting geometrical dimensions and an oscillating angle which is easy to effect, it is possible to obtain a large number of impulses per oscillation.

For example, for a displacement of 1° of arc, a distance of 10mm. between the center of an optical square and the rotational axis and a wavelength of 0.8/um, about 1,750 impulses are obtained.

Secondly at the level of the plano-parallel glass 7:

The second function synchronous with the production of the impulses is the exploration of a ruler 16, a mark 17 of which is to be surveyed with reference to the optical axis of the sighting system. This function is that of a photoelectric microscope of known type, comprising (FIG. 1) a straight filament lamp 18 (or a narrow slot illuminated by a lamp and a condenser). The image of the filament (or of the slot) is projected on the scale 16 by an object glass 19. The plano-parallel glass 7, as it oscillates, displaces the image projected by a to-and-fro movement according to a well-known process. The semi-transparent plate 20 is partially traversed by the light coming from lamp 18. It serves in the first place to return, to the photoelectric cell 21, the light returning from the scale 16 which has again passed through the object glass 19 and the oscillatory movement of which is removed on its return by the oscillating plano-parallel glass 7 (see U.S. Pat. No. 3,489,905). The cell 21 receives a pencil of light which is fixed in space, but modulated in intensity with reference to time when the light has met a non-reflecting mark. It thus delivers impulses characteristic of a photoelectric microscope. It is known that these impulses follow at regular intervals in time if the mark is centered on the optical axis and that they follow irregularly (one long period, one short period) if the mark is off-center.

Finally it will be noted that, since the pencil reflected by the ruler is also subjected to the action of the deflector, the luminous spot received by the photoelectric cell 21 is fixed and free from any parasitic modulation.

Thirdly at level of mirror 6

The second effect of the semi-transparent plate 20 is to reflect a portion of the light towards the mirror 22, which then transmits it through an object glass 23 to the oscillating mirror 6 which, it will be recalled, oscillates synchronously with the glass 7 and the support 5. The object glass 23 forms a real image of the straight filament of the lamp 18 or of the slot in the plane of a diaphragm 24 pierced with an opening 25. The collecting lens 26 concentrates the light onto cell 27.

The operation of the photoelectric microscope described is as follows (FIG. 2):

The cell 21, which forms part of the photoelectric microscope proper, emits an impulse on the outward and return exploratory journeys of deflector 7. These signals are conventionally shaped (28) so as to become rapid impulses (see U.S. Pat. No. 2,448,718).

The cell 27 emits a trapezoidal current which is also shaped (29) to become rectangular and which frames the signals originating from cell 21.

The cell 15 emits a sinusoidal current of high frequency which is shaped (30) to give two rapid alternating impulses (this shaping is optional).

The rectangular current coming from 29 operates a gate (31) the function of which is to allow the impulses coming from (30) to pass only so long as the rectangular current coming from 29 exists. Consequently (FIG. 3) the rectangular current 29 which exists from the moment t1 until t2, and from t3 until t4 on the diagram which shows in elliptical form the complete cycle of an oscillation, enables the impulses coming from 30, which we shall call "counting impulses" or I.C. to appear during the interval of time t1 to t2 with commencement at t1, and during the interval t3 to t4 with commencement at t3.

To summarize, at the output of gate 31, there are produced for each complete oscillation two clearly defined groups of counting impulses, one on the outward journey, one on the return journey. The impulses of the photoelectric microscope coming from 28 occur somewhere in the cycle TT. They will not be recorded unless they are in the region t1 to t2 on the outward journey and necessarily in the region t3 to t4 on the return journey. As an example, they may be at t5 and t6.

Let N designate the number of counting impulses provided by the coupled interferometer (coming from circuit 31) and bounded by each of the two identical spaces t1 to t2 and t3 to t4.

The counter 32 is reversible and is controlled in its plus and minus counting operation by an inverter 33 which is itself controlled by the main (syncronously with the frequency of cycle TT). The inversion is effected approximately at the end of travel of the oscillating system in the time interval t2 - t3 and t4 - t1. Let us assume that this occurs at about the instants t7 and t8. It can be seen that the instant of inversion is far from critical.

The counter 32 counts all the impulses arriving from 31 which reach it from instant t1 until the signal from the photoelectric microscope arrests it at instant t5. It deducts (subtracts) all the impulses arriving at it from 31 from instant t3 until instant t6.

Let $n$ designate the number of impulses counted between t1 and t5. The number of impulses deducted from t3 to t6 will necessarily be: $N - n$.

At the end of cycle, the counter 34 indicates a number X, where $$X = n - (N - n) = 2n - N$$

At the center of the field $n_c = N/2$ and $X_c$ (central position) will be:

$$X_c = 2N/2 - N = 0$$

If $n = 0$ $\quad Xo = 0 - N = -N$

If $n = N$ $\quad Xn = 2N - N = +N$

It will be seen that the counter 34 indicates for each cycle a number expressing twice the value counted in number of impulses with respect to the center which is conventionally considered as the position of zero divergence.

It will be noted especially that:

1. The number displayed is proportional to the real eccentricity, whatever the position, since the counting impulses, the frequency of which is modulated by the speed of the deflector, are of fixed numbers. It is uniquely dependent upon the position of the mark to be measured. This means that the counting is strictly independent of the permanent or instantaneous speed of the oscillating group comprising: the image deflector, the counting impulses generator (counting by interferences) and the field of measurement limiting device. 2. The number displayed may represent, provided the construction parameters are suitably chosen, any unit of length. For example microns.

If the arrangement is such for example that the impulses follow one another at intervals of 2μm, the display at each cycle will express the eccentricity in microns. 3. There is no purpose in displaying the result of counting after a single cycle. Experience shows that the random noise of the whole system does not permit the position of a stroke to be defined much closer than 0.08μm per cycle, a value which may be considered inadequate.

In conventional photoelectric microscopes of analogous type, a time constant, for example 2 seconds, is introduced into the display system, enabling a more accurate stable mean value to be produced.

In the device described above, the same effect may be obtained by allowing the counter to accumulate a number of cycles, for example 100. To do this, the clock 35 locks and returns to zero the buffer counter 34 of counter 32 (FIG. 2) for example every 100 cycles and transfers the value counted to the permanent display 36. This results in the following properties:

a. The display at 36 varies only if counting is not repeated. In this case the change is effected progressively, for example at the end of 100 cycles of 50H, corresponding to a delay of 2 seconds.

b. At the display 36, the position of the decimal point is intentionally displaced towards the left for example by two places. This amounts to dividing by 100 the 100 values measured in succession, which are not all identical. The effect of a statistical mean is thus obtained by calculation.

c. The decimals found by the statistical mean of the measurements are all valid and can be smaller than the interval of the counting impulses. It is clear, for example, that if the counting impulses follow one another at 2μm intervals, and if the measurements are repeated 1,000 times, the fractions indicating for example 1/100μm will certainly be sufficiently stable in permanence for their actual display to have some meaning. The further decimal places, too unstable, will not be displayed.

d. It may be noted that there is no purpose in making the interval of the counting impulses smaller than the mean scatter from 1 cycle to another, since each measurement cannot be smaller than the interval but at the same time, it cannot be more accurate than the scatter.

The effect of the statistical mean alone on a sufficient number of measurements enables the measuring to be refined and fractions which are smaller than the interval for the scatter to be displayed.

e. It would therefore appear that it might be advantageous to have a larger number of measurements from which a mean is prepared in a short period. This is in practice incorrect, since measurements which are very rapid are also more hazardous. Experience alone can indicate for each case what is the most favorable compromise between a large number of rapid measurements and a smaller number of slower, but better measurements.

f. It may be recalled that the clock 35 may be adjusted to accumulate an arbitrary number of measurements. To give an easily understood example, it will be assumed that the impulses follow one another for example at intervals of 2 μm, that, in consequence, the display which doubles the number counted, displays in intervals of 1 μm and that a mean of 100 measurements displays, by offsetting the decimal point two places to the left, values in μm, 0.1 μm and 0.01 μm.

g. If however the interval of the counting impulses is 1 μm, the counter will accumulate ½ μm units, and the clock 35, by limiting the accumulation to 50 cycles, will still enable figures of μm, 1/10 μm and 1/100 μm to be displayed.

h. It can be imagined that if the interval is not an exact length in the unit of measurement selected, the number of accumulations determined by the clock will be able to compensate the calibration error except for a fraction.

i. It is possible to change the unit of measurement by varying the number of accumulations. For example: by having a measured field of 127 μm and by placing 1,000 impulses in the field (1,000 on the outward journey and 1,000 on the return journey) and if there are accumulated, for example, 700 impulses outwards and, consequently, 300 to be subtracted on the return, resulting in 400 residual impulses per cycle, 88.9 μm will have been covered from the extreme left before the mark is reached and the mark will be found again by covering 38.1 μm on the return journey from the extreme right. The difference is 50.8 μm expressed by 400 impulses. But the divergence from the center (which is 63.5 μm from the left and also from the right) is 25.4 μm or, as demonstrated above, 50.8 μm divided by 2.

It is now desired, by accumulating impulses, to display either the true value in μm, or the true value in μ inches, with reference to the center.

To do this, the clock which counts the cycles will be adjusted to disengage at the end of 635 cycles. This will give 635 × 400 = 254,000, and the decimal point will be placed so as to read 25.4000 μm.

Or alternatively, the clock will be adjusted to disengage at the end of 250 cycles giving 250 × 400 = 100,000, and the decimal point will be placed so as to read 1,000.00 μ inches, which clearly corresponds to the same physical length as 25.4 μm. It is clear that other combinations of parameters can be selected, but the advantage of the arrangement described is: excellent stability in the indications given and extreme simplicity of switching from one system of measurement to another, while remaining mathematically correct.

I claim:

1. A high precision photoelectric microscope for reading the mark on a light-reflective surface of a precision ruler, comprising means for directing a pencil of light rays against said surface, an oscillating deflector causing said pencil of light rays to oscillate on said surface periodically from side to side of a median position, a first photoelectric cell capturing light rays reflected by said surface and controlling an electronic device for indicating the eccentricity of the mark from said median position, a deflection member secured to said oscillating deflector for oscillation therewith, means to direct a portion of said pencil of light rays against said deflector, said deflector returning said portion through a fixed mask onto a second photoelectric cell, an interferometer having a movable portion secured to said oscillating deflector for oscillation therewith, said interferometer having a third photoelectric cell which emits counting impulses, and an auxiliary electronic device supplied by said second and third photoelectric cells and sending to said electronic indicating device counting impulses distributed over a field of measurement determined by said fixed mask.

2. Photoelectric microscope according to claim 1, characterized by the fact that the interferometer comprises a fixed Kosters prism, two fixed mirrors and two movable optical squares mounted on a lever secured to the deflector and to the deflection member, as well as a luminous source and a photoelectric cell which captures the interferometer signals.

3. Photoelectric microscope according to claim 1, characterized by the fact that the electronic indicating device controlled by said first photoelectric cell comprises a shaping circuit and a reversible digital counter; by the fact that the auxilliary electronic device comprises an inverter controlling the state of addition or of subtraction of the reversible counter syncronously with the reversals of direction of the oscillation of the deflector, and by the fact that the auxilliary electronic device further comprises a circuit for shaping the signals emitted by the second photoelectric cell in the shape of rectangular waves, a circuit for shaping as abrupt counting impulses, the signals emitted by the third photoelectric cell and a gate circuit which permits the passage of the counting impulses only within the field of measurement bounded by the fixed mask and therefore within the signals, after shaping, emitted by the second photoelectric cell; this gate circuit supplying the input of the reversible counter.

4. Photoelectric microscope according to claim 3, characterized by the fact that the counting of the reversible counter starting at the first counting impulses of each train is arrested by signals originating from said first photoelectric cell.

5. Photoelectric microscope according to claim 4, characterized by the fact that the electronic indicating device further comprises a buffer counter which summates the totals of the reversible counter relating to successive cycles.

6. Photoelectric microscope according to claim 5, characterized by the fact that the electronic indication device further comprises a display.

7. Photoelectric microscope according to claim 6, characterized by the fact that the auxilliary electronic device further comprises a clock circuit supplied by inversion and arresting the counting of the buffer counter at the end of a determined number of cycles.

8. Photoelectric microscope according to claim 7, characterized by the fact that the clock circuit is adjusted so that the displayed indication of eccentricity, in the unit of measurement selected, shall be equal, except for a power of 10, to the number summated in the buffer counter.

9. Photoelectric microscope according to claim 8, characterized by the fact that the decimal point of the display is displaced towards the left by a number of places such that its indication corresponds to the measure of eccentricity in the unit of measurement selected.

* * * * *